(12) United States Patent
Monk et al.

(10) Patent No.: US 7,229,673 B1
(45) Date of Patent: *Jun. 12, 2007

(54) PROJECTILE BARRIER METHOD FOR SEALING LIQUID CONTAINER

(76) Inventors: Russell Allen Monk, 220 Culver La. South, Salem, OR (US) 97302; Thomas Stegen Ohnstad, 4668 Independence Dr. SE., Salem, OR (US) 97302; James Jackson Milham Henry, 6995 SW. Highland Ct., Wilsonville, OR (US) 97070

( * ) Notice: Subject to any disclaimer, the term of this patent is extended or adjusted under 35 U.S.C. 154(b) by 0 days.

This patent is subject to a terminal disclaimer.

(21) Appl. No.: 11/508,539

(22) Filed: Aug. 22, 2006

Related U.S. Application Data

(62) Division of application No. 11/067,525, filed on Feb. 25, 2005, now Pat. No. 7,169,452.

(60) Provisional application No. 60/629,259, filed on Nov. 19, 2004, provisional application No. 60/623,723, filed on Oct. 28, 2004, provisional application No. 60/621,263, filed on Oct. 20, 2004.

(51) Int. Cl.
*B05D 5/00* (2006.01)
*F17C 3/00* (2006.01)

(52) U.S. Cl. .................................. 427/407.1

(58) Field of Classification Search ............ None
See application file for complete search history.

(56) References Cited

U.S. PATENT DOCUMENTS

| | | | |
|---|---|---|---|
| 2,308,342 A * | 1/1943 | Wilkinson et al. | 138/133 |
| 3,509,016 A | 4/1970 | Underwood et al. | |
| 3,698,587 A | 10/1972 | Baker et al. | |
| 3,801,425 A | 4/1974 | Cook | |
| 4,115,616 A | 9/1978 | Heitz et al. | |
| 4,216,803 A | 8/1980 | Hall | |
| 4,345,698 A | 8/1982 | Villemain | |
| 4,352,851 A | 10/1982 | Heitz et al. | |
| 4,422,561 A | 12/1983 | Grosvenor et al. | |
| 4,728,711 A * | 3/1988 | Rosthauser et al. | 528/73 |
| 7,044,166 B1 * | 5/2006 | Monk et al. | 138/99 |

* cited by examiner

*Primary Examiner*—William Phillip Fletcher
(74) *Attorney, Agent, or Firm*—Jon M. Dickinson, PC; Robert D. Varitz, PC

(57) ABSTRACT

A method for sealing a liquid container against leakage as a result of container penetration by a striking projectile. The method involves applying to the outside surface of such a container a coating possessing cooperative, penetration-sealing characteristics including (a) elastic elongatability before breakage within a range of about 300-400%, and (b) leakage-liquid-contact swelling, accompanied by leakage-liquid/coating contact-triggered coagulation.

5 Claims, 2 Drawing Sheets

PROJECTILE BARRIER METHOD FOR SEALING LIQUID CONTAINER

CROSS-REFERENCES TO RELATED APPLICATIONS

This patent application is a Divisional application from prior-filed, immediate parent U.S. patent application Ser. No. 11/067,525, filed Feb. 25, 2005, now U.S. Pat. No. 7,169,452, for "Projectile Barrier and Method", which immediate parent application claims respective priorities to three U.S. Provisional Patent Applications, the entireties of whose disclosure contents, along with the disclosure content of the mentioned immediate parent application, are hereby incorporated herein by reference. These prior-filed provisional applications include: (a) U.S. Provisional Patent Application Ser. No. 60/621,263, filed Oct. 20, 2004, for "Projectile Barrier and Method"; (b) U.S. Provisional Patent Application Ser. No. 60/623,723, filed Oct. 28, 2004, for "Projectile Barrier and Method Including Substance Coagulation"; and (c) U.S. Provisional Patent Application Ser. No. 60/629,259, filed Nov. 19, 2004, for "Differentiated-Thickness Layer-Sandwich Projectile Barrier and Method".

BACKGROUND AND SUMMARY OF THE INVENTION

This invention, which is illustrated and described herein in a military setting wherein it offers special utility (though it is not per se dedicated to military use), relates to methodology relating to a layered jacket barrier structure which may be applied as an outside surface coating to an exposed container, such as to the tanker container body in a large hydrocarbon fuel-supply truck, and to a vehicle's exposed hydrocarbon fuel tank, to effect quick self-sealing against leakage from a container puncture wound, such as a penetrating bullet wound. We refer to this methodology-implementing coating structure as being a barrier structure that disables a container-penetrating projectile, such as a bullet, from producing an uncontrolled liquid leak from the container.

For illustration purposes only, a preferred manner of practicing the methodology of the invention is disclosed in the context of an embodiment of a layered coating which is specifically disclosed and illustrated herein in relation to a fuel tank in a smaller-than-tanker military vehicle. As will be explained, application of this coating to a liquid container, such as a hydrocarbon fuel container, has proven to be extremely effective in quickly stopping fuel leakage from a container puncture wound.

Importantly in a military combat setting, such a coating can, in relation to implementation of the methodology of the invention, effectively substantially nullify a combat tactic which involves (a) creating a penetrating bullet wound in such a tank/container, (b) thereby producing flammable fuel leakage typically enhanced by the usual positive residual pressure in that tank, (c) and then, using and firing an incendiary projectile, igniting the leaked fuel to attack the associated vehicle by fire.

The layered coating proposed to be created by practice of the present invention, which coating is also referred to herein as a projectile disabling barrier structure, employs two foundation materials, one of which, by itself, is employed as a singularity to form one type of the two different layer types, or structures, employed according to the invention, and the other of which is combined, as an entrained substance, in and with the first-mentioned foundation material to form the second layer type. The second layer type, which combines the two materials just generally mentioned, performs with behavior that effectively characterizes a de facto third "type" of material—in effect, a composite material. Application of the coating to a to-be-protected container is quickly and easily accomplished.

Several different layered coating structures are illustrated and described herein to be producible in accordance with practice of the invention, with the preferred coating-structure preparation involving a coating formed, as will shortly be described, as one including three cooperative layers. These coating-forming layers are readily produced in a "field" setting at the site of a designated container.

According to practice of the invention, and in the mentioned, illustrative setting involving an exposed fuel tank in a military vehicle, the exposed surface of such a tank is appropriately coated/jacketed with a sandwiched, plural-layer, self-healing/self-sealing barrier structure which implements several important, cooperative mechanisms for mending a bullet-puncture fuel leak.

One of these mechanisms features significant elasticity furnished by elastic stretch and recovery of a very high-elastic-stretch-capable (about 400% elongation before breakage) elastomer. The elastomer employed to implement this mechanism is also a modest "reaction-time" substance which responds, in the setting now being described, to fuel contact with modest hydrocarbon fuel-imbibing and swelling actions. The term "modest" will be characterized herein shortly.

Another mechanism employs a layer-embedded pellet, or bead-like, fuel-imbiber material (also called a "reaction" substance) which responds aggressively and quickly to contact with the usual hydrocarbon fuel to undergo a rapid absorption (imbibing) of any leaking fuel, accompanied by a rapid, three-dimensional, physical, synergistic, swollen-volume enlargement (about 300%) because of such absorption. The term "synergistic" is used herein because of the fact that the swollen bead volume which develops as just mentioned appears to be greater than the sum of the individual volumes of the interacting fuel and the reaction-substance bead-like material.

Still a further mechanism involves the use per se of the mentioned bead-like material, which further responds to contact with hydrocarbon fuel in a manner which results in a congealing reaction occurring between absorbed fuel and the imbibing bead material. This congealing reaction can be likened to coagulation, with respect to which there results a tacky, thickened mass of material that tends to coalesce so as to form a very tenacious barrier continuum which contributes significantly to the blockage of outward flow and leakage of fuel from a tank.

Yet another mechanism at work in the sealing operation of the invention comes about because of tension which exists in an outer elastomeric material layer that forms part of the invention. This tension leads to enhanced compression of leakage-contact-swollen layer material in the vicinity of a container puncture wound.

The consequences of the above-mentioned mechanism actions and behaviors are that a leakage passage which results from a bullet (projectile) strike which penetrates the proposed layer-like barrier structure (a) is rapidly substantially fully closed almost immediately by the mentioned elastomer mechanism, (b) is additionally compression-sealed quickly by fuel-imbibing-produced material swelling and expansion resulting from material contact with leakage fuel, and (c) is further closed off by the coagulation/congealing action just mentioned.

These and other important mechanisms and features, soon to be more fully described, are provided by a uniquely created, multi-layer jacket which includes, fundamentally, the above-mentioned, several, different, individual and composite materials which work in cooperation with one another in accordance with the invention. Among these other mechanisms and features are (a) that initial tension is built into the outer layer of a plural-layer structure fabricated in accordance with the invention, and (b), that the different layers preferably, though not necessarily, and as initially created, increase in thickness progressing outwardly through the layer structure from the surface of a protected fuel (or other) tank.

All of the features and operating mechanisms of the invention will be more fully understood and appreciated as the description which now follows is read in conjunction with the accompanying drawings.

DESCRIPTION OF THE DRAWINGS

In FIG. 4, certain cross-sectional shading has been omitted for the sake of visual clarity.

DETAILED DESCRIPTION OF THE INVENTION

Figure 1:
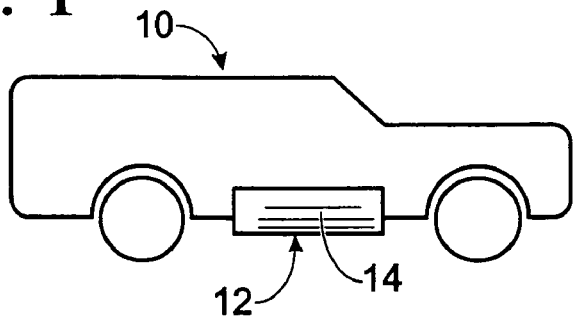
FIG. 1 is a simplified, small scale, side view of a military vehicle having an exposed fuel tank, the outer surface of which has been treated with a layered barrier coating prepared in accordance with a preferred manner of practicing the present invention.

Turning attention now to the drawings, and referring first of all to FIGS. 1-4, inclusive, shown generally at 10 in FIG. 1 is a military vehicle which possesses a laterally disposed, exposed steel fuel tank, or container, 12. This tank is covered, at least on its laterally exposed outside surface expanse, by a plural-layer barrier sandwich coating structure 14 which has been constructed in accordance with the present invention. Tank 12 contains liquid hydrocarbon fuel (not specifically shown) which is typically under a certain small amount of pressure (say about 4-5-psi) which is above normal atmospheric pressure. This elevated pressure, which of course exacerbates fuel leakage in the event of a tank puncture, exists for several well-known reasons, one of which, as an illustration, involves normal fuel vapor pressure.

It should be understood that the word "container" as employed herein is not confined to meaning only a vehicle's fuel tank. It may also apply, as examples, to a conduit, to a fuel-supply tanker, to holding tanks, to rail tanker cars, and to other kinds of liquid containers.

Figure 2:
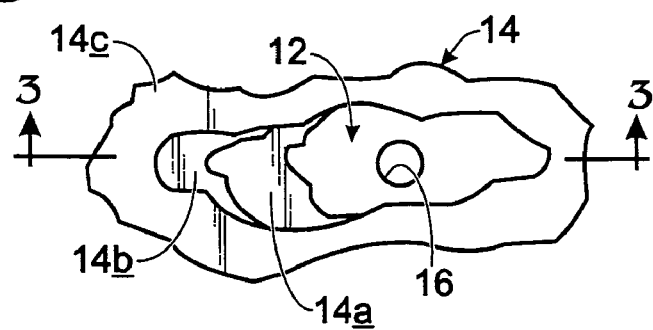
FIG. 2 provides an enlarged, fragmentary, detail view of a portion of the outside of the fuel tank shown in the vehicle of FIG. 1. In particular, it illustrates a situation where a bullet has punctured this tank. Portions of the structure shown in this figure have been broken away for illustrative purposes.
Figure 3:
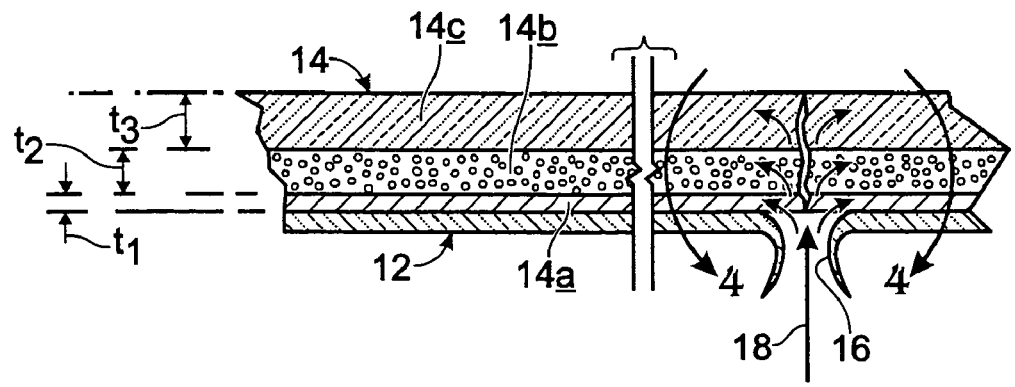
FIG. 3 illustrates, fragmentarily, and on a larger scale than that which is employed in FIG. 2, a cross-sectional view taken generally along the line 3-3 in FIG. 2.
Figure 4:
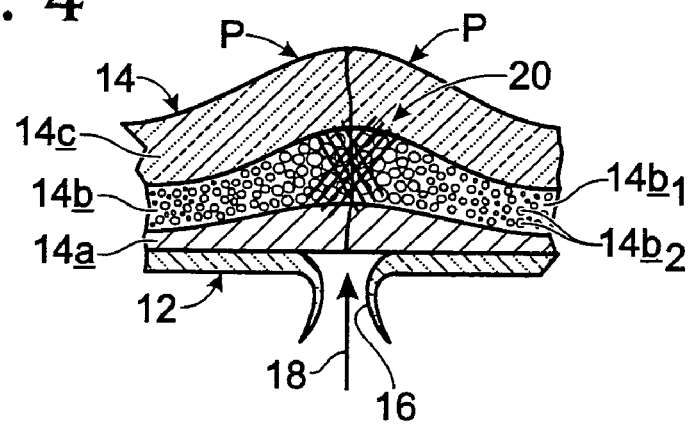
FIG. 4 is a still further enlarged cross-sectional view of the region in FIG. 3 which is bracketed by curved arrows 4-4.

Coating 14, in its preferred embodiment, and which is best pictured in FIGS. 2-4, inclusive, includes three unified layers, or layer structures, 14a, 14b, 14c.

Layer 14a, which is also referred to herein (a) as a first-type barrier layer structure, (b) as a bonding layer, and (c) as a leakage-responsive substructure, has a preferable thickness (see $t_1$ in FIG. 3) of about ⅛-inches. This layer is directly joined (bonded) to the outside surface of tank 12, and is formed of a suitable high-elasticity, high-tensile-strength, high-tear-resistance elastomer. A very suitable material for layer 14a is a two-component polyurethane elastomer product called TUFF STUFF® FR(with the letters FR standing for fire-resistant), made by Rhino Linings USA, Inc.—a company based in San Diego, Calif. This material is applied, as will later herein be described, by spraying it onto the outside surface of tank 12. It exhibits an elasticity which permits an elastic elongation before "breakage" of about 400%, has a tensile strength of about 1700-1900-psi, and possesses a tear resistance of about 140-150-pli. The material forming this layer reacts modestly, and over a relatively long time period, to contact with hydrocarbon fuel, imbibing such fuel, and swelling in the process. In the preferred practice of the invention which is now being described, this "modest" reaction time period extends to up to about 20-minutes relative to a puncture wound.

Layer 14b, which is also referred to herein (a) as a second-type barrier layer structure, (b) as an expansion layer, and (c) as a leakage responsive substructure, has a preferable thickness (see $t_2$ in FIG. 3) lying within the range of about ⅛- to about 3/16-inches. This layer is formed as a special composite structure which includes an elastomeric expanse portion $14b_1$ (see FIG. 4) formed of the same material used in layer 14a, in which expanse is entrained what is called herein a reaction substance which takes the form of a distribution of small liquid-imbiber beads $14b_2$ (see FIG. 4). These beads, also referred herein as elemental components, have a strong affinity for rapidly fully absorbing (imbibing) various liquids, such as hydrocarbon fuel, and they swell significantly in volume as a consequence. Rapid full imbibing typically occurs in under about a half-minute. A very suitable imbiber-bead material is the product known as IMB230300 made by Imbibitive Technologies America, Inc. in Midland, Mich. These beads preferably are blended in any appropriate manner into the entraining elastomer material to constitute about 20% by weight in the combined material. This combined material for layer 14b is then applied to layer 14a by spraying to achieve the desired thickness mentioned above. While the weight percentage of entrained beads is preferably at the 20% level, a suitable range lies between about 15% and about 25%.

Composite layer 14b is characterized by possessing an elasticity which permits an elastic elongation (before breakage) of about 67%, a tensile strength of about 483-psi, and a tear resistance of about 115-pli.

Layer 14c, which is also referred to herein as a compression layer, has a thickness (see $t_3$ in FIG. 3) of about ¼-to about ⅜-inches. It is made of the same material used in layer 14a, and is also spray-formed to the desired thickness on the outside of layer 14b. After application and "curing" of this layer, a certain level of tension exists in this layer. This tension, coupled with the mentioned relatively large thickness, significantly contributes to the ability of layer 14c to produce enhanced sealing compression of underlying layer material in the region of a puncture wound.

Thus, and as one will note, the three layers which make up coating 14 are preferably differentiated in thickness, progressing outwardly from tank 12 with increasing thicknesses.

While the exact manner of preparing and applying the various layers that make up coating 14 will vary from application to application, as for example depending upon the nature of the container material to which the coating is to be applied, those skilled in the art will understand, from the description which is now to follow of one manner of preparing coating 14 in accordance with practice the present invention, how variations may be implemented to suit such other applications. The application process now to be described relates to applying coating 14 to the outside surface of the steel fuel tank in military vehicle 10.

With respect to use of the two foundation materials that make up layers 14a, 14b and 14c—namely the mentioned elastomeric material and the mentioned imbiber bead material—it is important that the surface of the fuel tank be appropriately prepared so that inner layer 14a will bond and adhere suitably to the tank. The tank may be prepared with an appropriate primer, to a thickness of about 3- to about 5-mils, with this primer coating initially presenting a light shine, and entering a curing period of about 45- to about 60-minutes. After the curing period, this primer coating will be dry, but will possess a slight tack surface.

With respect now to creating the various layers of coating 14, taking the materials which have been described above herein as being preferred materials to employ, we have found that it is best to apply these materials (in a manner which will now be described) through orthogonally associated alternate groups of successive, overlapping, substantially parallel, linear spraying passes, all performed at an applied-material temperature of about 65- to about 80-degrees Fahrenheit, and in an ambient air temperature of about 70-degrees Fahrenheit, with a relative humidity of about 50-percent or less. We have determined that the very best ambient temperature and relative humidity conditions are those wherein these is an absolute value difference between them is about ten (10) or greater.

Inner layer 14a is first applied simply by appropriate, alternate groups of such successive spray passes utilizing the mentioned elastomeric material. A first round (group) of substantially parallel, linear spray passes may be suitably overlapping lateral left-to-right and right-to-left, followed by a series of laterally overlapping up-to-down and down-to-up vertical passes, and so forth, until the desired inner layer thickness is achieved.

Composite layer 14b is then applied by suitably blending the same elastomeric material which has been used in layer 14a with imbiber beads which become entrained in the elastomeric material by the preferred weight contribution mentioned above. Here, also, layer application is accomplished by successive, alternate groups of horizontal and vertical overlapping spray passes until the desired thickness attained.

Finally, outer layer 14c is applied via substantially the same horizontal and vertical overlapping spray activities until the desired outer layer thickness develops.

It will be clear to those skilled in the art that variations of layer thicknesses and/or container surface preparations may be selected for different specific applications.

FIGS. 2-4, inclusive, illustrate that a bullet has penetrated the three layers in coating 14, and has punctured tank 12 to produce a penetration, or puncture, wound 16 in the wall of the tank.

Almost instantly after the bullet strike, and the resulting penetration, layers 14a, 14b, 14c, "re-close" upon themselves elastomerically to initiate a fluid seal directly over the tank puncture wound. This is clearly illustrated in FIG. 3, and it comes about especially because of the high intrinsic elasticity in layers 14a and 14c, and in the elastomeric expanse portion $14b_1$ in layer 14b.

Fuel begins to leak through wound 16, as indicated by arrow 18 in FIG. 3, and in the process of leaking comes into contact with the materials present in layers 14a, 14b, 14c. It turns out, as mentioned earlier, that both of the foundation materials which are employed variously in layers 14a, 14b, 14c respond with fuel-imbibing and volumetric-swelling reactions in relation to contact with fuel leaking from tank 12. The composite structure in layer 14b exhibits a significantly greater volumetric swelling rate than that exhibited by the elastomer material alone in layers 14a, 14c. This cooperative and collaborative swelling, combined with the enhanced compression-producing tension which is present especially in compression layer 14c, creates significant sealing pressure within coating 14 in the important region immediately outside of and around puncture wound 16. This condition is illustrated quite clearly in FIG. 4.

Additionally, and very importantly, leakage fuel and the material in beads $14b_2$ react chemically and cooperatively to congeal and form a tacky and sticky coagulant mass, pictured at 20 in dark, central, cross-hatch lines in FIG. 4. This coagulant mass effectively provides a positive blockage (in the form of a sealing continuum across the path of the puncture wound) to any continued fuel leakage.

The rapid response associated with the behavior of beads $14b_2$ causes major fuel leakage to become inconsequential within under about one to five minutes. Substantially all leakage is normally stopped after the elapse of about 20-minutes, owing to the more modest, time-extended response nature of the elastomer material in coating 14. During this longer time period, elastomer in layer 14b effectively brings a large lateral number of the imbiber beads into the invention's sealing action.

Figure 5:
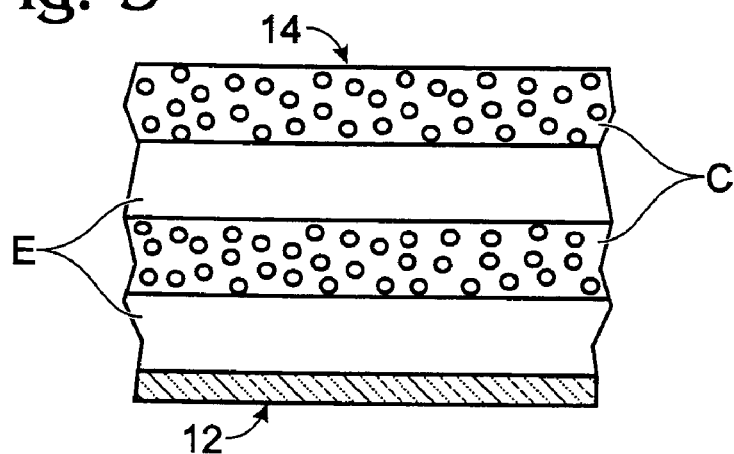
FIGS. 5 and 6, illustrate two different modifications of the barrier coating pictured in FIGS. 2-4, inclusive, also prepared in accordance with practice of the present invention.
Figure 6:
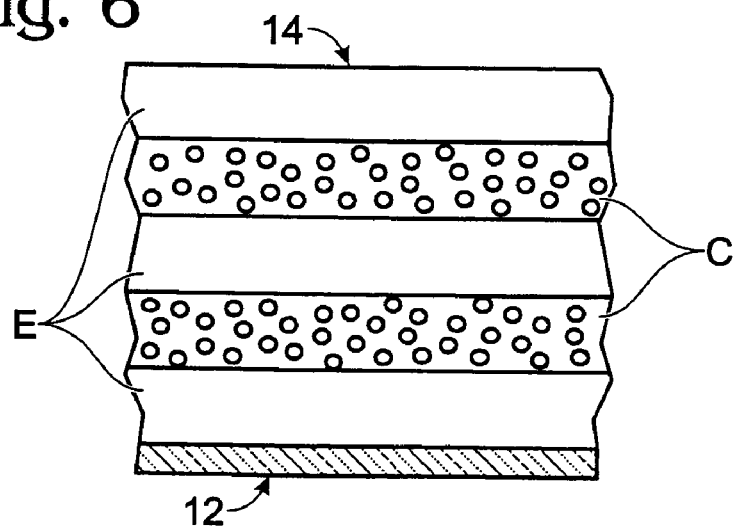

Turning attention now to FIGS. 5 and 6 in the drawings, these two figures illustrates each a layer structure created in accordance with alternative manners of practicing the present invention. Material layers in these two figures are labeled either E for elastomer, or C for combination (composite). The E layers are like layers 14a, 14c in FIGS. 2-4, inclusive. Layers C are like layer 14b. These E and C layers are not illustrated in exact thickness-scale relative to one another.

The invention thus proposes unique preparation of a unique plural-layer coating (in various alternative forms) for rapidly sealing, against liquid leakage, a puncture wound in the wall of a liquid container. Following the occurrence of such a wound, the coating prepared in accordance with the invention responds effectively with both rapid and longer-term sealing actions involving (a) an elastomeric puncture-path, pressure-closure response, (b) a leakage-liquid-imbibing and swelling response, aided by elastomeric response (such as tension in the compression coating layer), to apply sealing pressure which is effective to close a puncture wound, and (c) a coagulation response to create a leakage-blocking coagulant mass which forms a blockage continuum across the path of a puncture wound.

While a preferred methodologic practice of the invention has been described and illustrated herein, and several modifications described, it is appreciated that other variations and modifications may be made without departing from the sprit of the invention.

We claim:

1. A method for sealing a liquid container anticipatorily against leakage as a result of a potential, future container penetration created by a striking projectile comprising applying to the outside surface of such a container a coating possessing plural cooperative penetration-sealing characteristics including
(a) elastic elongatability before breakage within a range of about 300-400%, and
(b) leakage-liquid-contact swelling, accompanied by leakage-liquid/coating-contact-triggered coagulation.

2. The method of claim 1, wherein said applying comprises creating the mentioned coating in plural layers including at least one layer which is characterized principally by material elastic elongation as expressed in (a), and at least one other layer which is characterized principally by swelling and coagulation as expressed in (b).

3. The method of claim 2, wherein said applying further comprises disposing the at least one layer directly against the outside surface of such a container, and disposing the at least one other layer on the opposite side of the at least one layer relative to the container.

4. A response method for sealing a liquid container against leakage as a result of a container-wall penetration by a striking projectile comprising
responding to such a penetration by
(a) generating, adjacent and within the region of penetration, a coagulant mass in which container leakage liquid per se is a contact-triggering contributor to coagulation, and
(b) stabilizing this generated mass with compression in a manner which tends to urge the mass into a sealing relationship relative to the penetration.

5. The method of claim 4, wherein said stabilizing with compression is performed through the operative agency of an elastomer which is in tension and in operative contact with the generated mass.

* * * * *